Feb. 27, 1973    P. P. BEY ET AL    3,718,602
LIQUID MEDIUM FOR OPTICAL THIRD HARMONIC GENERATION
Original Filed Sept. 25, 1968                2 Sheets-Sheet 1
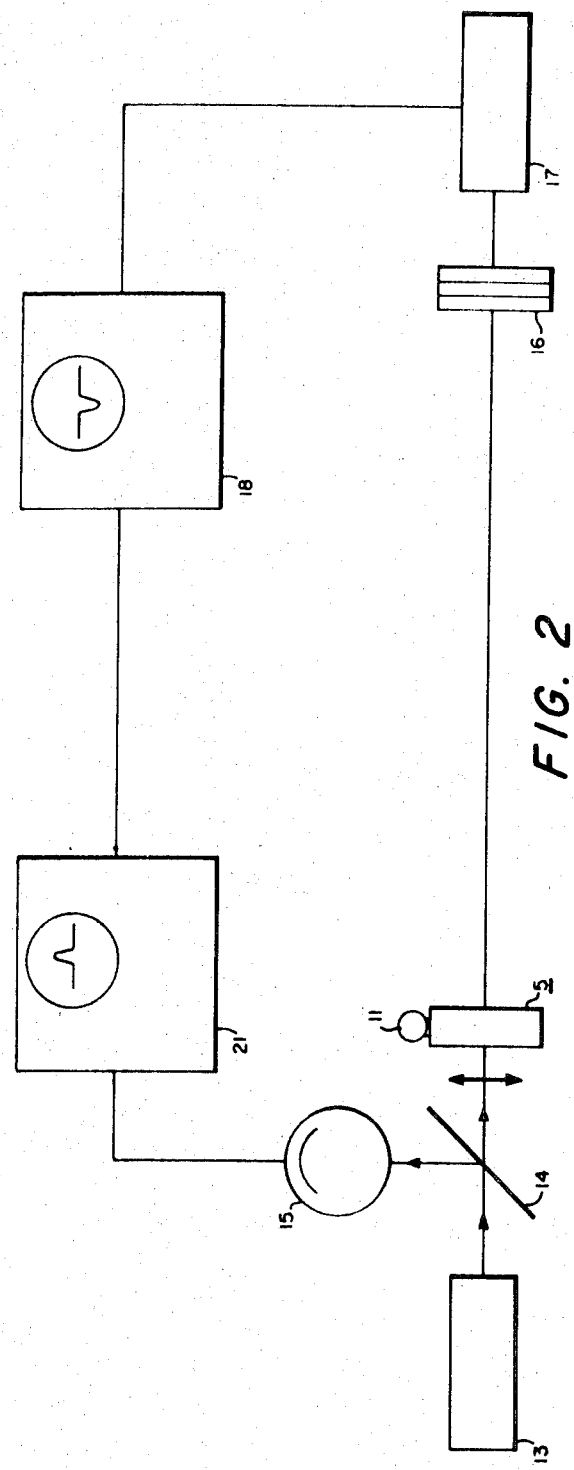
INVENTOR
PAUL P. BEY
JOHN F. GIULIANI
HERBERT RABIN
BY *Melvin L. Crane* AGENT
   *[signature]* ATTORNEY

United States Patent Office 3,718,602
Patented Feb. 27, 1973

3,718,602
LIQUID MEDIUM FOR OPTICAL THIRD HARMONIC GENERATION
Paul P. Bey, Oxon Hill, John F. Giuliani, Kensington, and Herbert Rabin, Bethesda, Md., assignors to the United States of America as represented by the Secretary of the Navy
Original application Sept. 25, 1968, Ser. No. 762,553. Divided and this application July 19, 1971, Ser. No. 163,677
Int. Cl. C09k 1/02
U.S. Cl. 252—301.2 R        5 Claims

ABSTRACT OF THE DISCLOSURE

This invention is directed to a liquid medium of dye fuchsin in hexafluoroacetone sesquihydrate or hexafluoroisopropanol which generates an enhanced third harmonic light wave of the 1.6 micron neodymium laser line.

CROSS-REFERENCES OF RELATED APPLICATION

This application is a division of application Ser. No. 762,553 filed Sept. 25, 1968, now Pat. No. 3,600,600.

BACKGROUND OF THE INVENTION

This invention is directed to a device for generating a third harmonic light wave and more particularly to a nonlinear medium for generating a phase-matched third harmonic light wave of the neodymium laser.

When high intensity laser radiation passes through a medium, light waves are produced with frequencies which are multiples of the original laser frequency. Heretofore, enhanced second and third harmonic light, has been generated by phase-matching the laser and its associated harmonic waves in birefringent crystals. The phase-matching conditions requires that the crystal axes be accurately oriented with respect to the direction of the incident laser beam. This insures that efficient harmonic radiation can be generated by the fundamental laser radiation.

In addition to the high cost of cutting, polishing and mounting crystals for harmonic type generation, there are a number of properties of crystals which limits the maximum harmonic power that can be generated. These include: (1) the divergence between the fundamental and harmonic waves in the crystal, (2) dielectric breakdown in the crystal produced by high power laser irradiation, and (3) divergence of a focussed laser beam in the crystal.

This invention provides a means for generating the third harmonic (353 millimicrons) of the neodymium laser line (1.06 microns) by the employment of anomalous dispersion in a nonlinear liquid medium for phase-matching the laser and its third harmonic wave. The normally unmatched dispersive liquid employed in this device is the solvent hexafluoroacetone sesquihydrate, $(CF_3)_2CO \cdot 1.5\ H_2O$ to which has been added a dye fuchsin to produce an anomalous dispersion; phase-matching is achieved at a dye concentration of approximately 45 grams of dye per liter of solvent. This specific solvent in a transparent container constitutes an element in the present system for generating the third harmonic of the neodymium laser line.

An alternate liquid medium which may be similarly employed in hexafluoroisopropanol, $(CF_3)_2CHOH$, with a lesser amount of the dye fuchsin to produce phase-matching at approximately 37.5 gm. per liter liquid.

The invention may be employed to generate a third harmonic wave of a laser source by propagating the laser radiation through an isotropic or anisotropic nonlinear medium. When an anisotropic medium is used the direction of the laser radiation must be propagated along a three-fold axis of the anisotropic medium. In case of a liquid which is isotropic, there is no preferred axis.

A more complete discussion of this device, the fluids used therein, and its use may be found in the following articles: (1) "Generation of a Phase-Matched Optical Third Harmonic by Introduction of Anomalous Dispersion Into a Liquid Medium" Physical Review Letters, vol. 19, No. 15, Oct. 9, 1967, pp. 819–821. (2) "Linear and Circular Polarized Laser Radiation in Optical Third Harmonic Generation," published in Physics Letters, vol. 26A, No. 3, Jan. 1, 1968, pp. 128–129; and (3) "Phase-Matched Optical Harmonic Generation in Liquid Media Employing Anomalous Dispersion." IEEE Journal of Quantum Electronics No. 11, vol. QE4, pp. 932–939, November 1968.

STATEMENT OF THE OBJECTS

It is therefore an object of this invention to provide a simple and inexpensive means for producing phase-matched third harmonic wave from a fundamental neodymium laser wave.

Another object is to provide a liquid for generating a third harmonic wave from a fundamental linear polarized wave which can withstand very high laser intensity.

Yet another object is to provide a liquid for the production of a third harmonic signal independent of the direction of a laser beam in propagating through the device.

Other and more specific objects of this invention will become apparent upon a careful consideration of the following detailed description when taken together with the accompanying drawings in which:

BRIEF DESCRIPTION OF THE DRAWING

FIG. 1 illustrates a third harmonic generating cell which may be employed in accordance with the teachings of this invention;

FIG. 2 illustrates a third harmonic generating cell in an optical system in which a neodymium laser wave is linearly polarized.

DESCRIPTION OF THE PREFERRED EMBODIMENT

Figure 3:
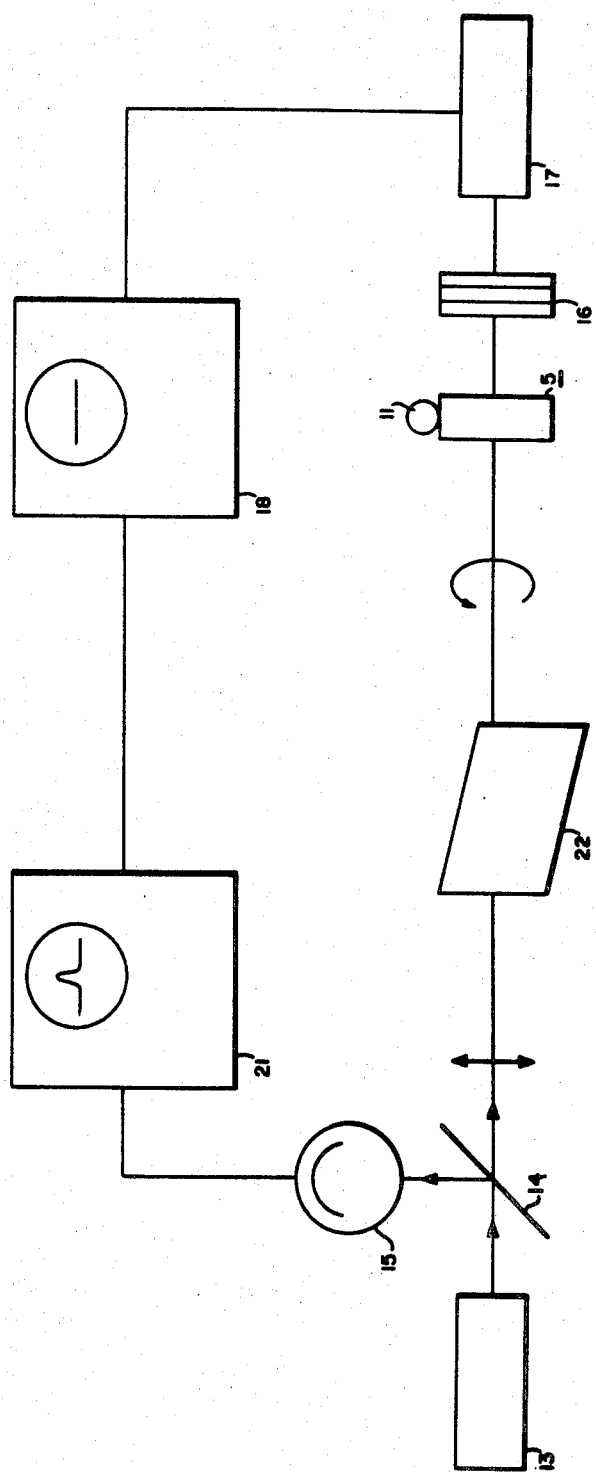
FIG. 3 illustrates a third harmonic generating cell in an optical system in which a neodymium laser wave is circularly polarized.

Now referring to the drawings, there is shown by illustration in FIG. 1, a third harmonic generating cell which is used in the systems shown by illustration in FIGS. 2 and 3. This cell may be a commercially available, short path length, type DX, liquid cell made by the American Instrument Company. The cell is made of coaxially arranged tubular members 6 and 7 with a spacing between the tubular members and parallel end plates 8 and 9, which enclose one of the ends of each of the tubular members. The free ends of the tubular members are secured to each other to seal off the ends of the tubular members. The container is provided with a filler opening 10 and a stopper 11 to seal the fluid within the container. The linear spacing between the tubular members forms a reservoir and the spacing between the parallel end plates provide a window through which a laser beam passes.

A cell former in such an arrangement allows heat generated by the passage of a laser beam through the fluid between the parallel end plates to be carried to the reservoir. The reservoir-container 5 includes therein a harmonic generating solution 12 containing the dye fuchsin dissolved in either of two solvents, hexafluoroacetone sesquihydrate $(CF_3)_2$ CO . 1.5 $H_2O$ or hexafluoroisopropanol $(CF_3)_2$ CHOH. The dye concentrations are approximately 45 grams per liter of solvent and 37.5 grams per liter of solvent, respectively, and the path length between the parallel end plates is about 0.05 centimeter. The third harmonic generating solution is formed by combining the dye with the solvent and then pouring the solution into the con-filled. The stopper 11 is then placed in the filler opening to prevent fluid loss. Thus, the solution is contained between the walls of the coaxially aligned cylindrical members and the end members that form the window through which the laser beam passes.

FIG. 2 illustrates the third harmonic generating cell 5 in a laser-optical system. As shown, a fundamental linearly polarized light source generated by a neodymium laser 13 is directed onto a beam splitter 14 which reflects a portion of the light onto a photodiode 15 and permits the remainder of the light to pass. The light that passes through the beam splitter 14 is directed onto the third harmonic generator cell 5 where the optical interactions of the light in propagating through the medium 12 produces a third harmonic wave which emerges from the cell. The third harmonic wave then passes through a filter pack 16 and is detected by a photo-multiplier tube 17. The output signal produced by the photo-multiplier tube is applied to the Y-amplifier of an oscilloscope 18 which produces a signal as shown. The signal shown illustrates a third harmonic pulse (inverted). The photodiode 15 produces an output signal representative of the light pulse as generated by the laser which is applied to an oscilloscope 21 producing a pulse as shown. The oscilloscope 21 is connected electrically with the scope 18 to trigger the sweep of scope 18 upon the receipt of a signal from the diode 15.

FIG. 3 illustrates an arrangement similar to that of FIG. 2, however, the system includes a Fresnel rhomb 22 in the light path before the third harmonic generating cell 5. The Fresnel rhomb converts the fundamental linearly polarized light to circularly polarized light as represented by the circular arrow. Other optical elements or means may be similarly employed to obtain circularly polarized light. The circularly polarized light is then incident on the cell 5 and there is no third harmonic output from the cell as shown by the scope 18. Again, the scope 21 shows the signal due to the laser pulse incident on photodiode 15. Therefore, FIGS. 2 and 3 demonstrate that a third harmonic wave can be generated with a linear polarized fundamental wave whereas the third harmonic vanishes for a circularly polarized fundamental wave.

It has been shown from the above, that an enhanced phase-matched third harmonic neodymium laser light wave, utilizing anomalous dispersion, has been generated by the use of the third harmonic generating cell 5. This third harmonic signal is generated completely independent of the direction of the laser beam propagating through the medium of cell 5 and there is little if any damage to the dye-solvent solution due to high power laser radiation.

The laser-optical systems of FIGS. 2 and 3 have been used to illustrate that an absorption cell containing a solution consisting of the dye fuchsin and a solvent does generate a third harmonic signal from a linear polarized fundamental wave of a neodymium laser. Thus, the cell containing the dye in solution may be used in a system in which the third harmonic wave of a neodymium laser may have practical application. In using the system, the light upon emerging from the cell is directed through any appropriate optical system to obtain results which may be derived from application of a third harmonic wave of a neodymium laser output. Thus, the appropriate optical system for making practical uses of the third harmonic wave will replace elements 16, 17, and 18 as shown in the system of FIG. 2. If desired, the light output of the neodymium laser may be directed directly into the absorption cell 5 whereby eliminating elements 14, 15, and 21. Therefore, a system for practical application may include the neodymium laser, the third harmonic generator cell, and any additional elements needed in making use of the third harmonic wave generated by the absorption cell 5. Since it is only necessary that the neodymium laser radiation pass through the phase-matched liquid, this liquid might be used or contained by means other than the particular absorption cell 5, cited as an example.

Several applications employing a system including the third harmonic generation cell are the folowing:

(1) Identification of third harmonic radiation.

(2) The system can be used as an optical switch or amplitude modulator by varying the state of the fundamental laser polarization, a third harmonic intensity can be varied accordingly.

(3) Pulse narrowing can be accomplished with this device since the third harmonic pulse emerging from the cell is narrower than its fundamental.

(4) The device can be used in the measurement of pulse-widths, particularly ultrashort pulses such as obtained with mode-locked lasers where a linear polarized laser beam is divided into the circularly polarized components of opposite sense and they generate a third harmonic signal only when in coincidence is passing through the third harmonic generating device. By varying the time delay between the two circular components the pulse widths can be determined by their interference.

The above examples are the most obvious uses of a system using the third harmonic generation cell; however, there are other applications which may be apparent to those skilled in the art.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A liquid medium having anomalous dispersion properties that produce phase matching of fundamental and harmonic waves of neodymium laser light thereby converting optical energy of the 1.06 micron fundamental frequency wave incident upon said liquid medium into optical energy of the 353 millimicrons third harmonic frequency wave;

said liquid medium consisting essentially of a solvent selected from a group consisting of hexafluoroacetone sesquihyrate and hexafluoroisopropanol, and dye fuchsin additive in said solvent in an amount sufficient to produce said phase matching.

2. A liquid medium as claimed in claim 1; wherein, said solvent is hexafluoroacetone sesquihydrate.

3. A liquid medium as claimed in claim 2; wherein, said dye fuchsin additive is approximately 45 grams per liter of said solvent.

4. A liquid medium as claimed in claim 1; wherein, said solvent is hexafluoroisopropanol.

5. A liquid medium as claimed in claim 4; wherein, said dye fuchsin additive is approximately 37.5 gram per liter of solvent.

References Cited
UNITED STATES PATENTS

| | | | |
|---|---|---|---|
| 3,364,433 | 1/1968 | Freund | 330—5 X |
| 3,389,269 | 6/1968 | Giordmaine et al. | 307—88.3 |
| 3,390,278 | 6/1968 | Giordmaine et al. | 307—88.3 |

OTHER REFERENCES

Gorban et al. "Chemical Abstracts" vol. 51, p. 63546, 1957.

OSCAR R. VERTIZ, Primary Examiner

P. COOPER, Assistant Examiner